United States Patent [19]
Campbell

[11] 4,146,484
[45] Mar. 27, 1979

[54] DOCTOR BLADE CLEANING ASSEMBLY

[75] Inventor: Gordon L. Campbell, Elmhurst, Ill.

[73] Assignee: Hycor Corporation, Lake Bluff, Ill.

[21] Appl. No.: 836,531

[22] Filed: Sep. 26, 1977

[51] Int. Cl.² .............................................. B01D 33/36
[52] U.S. Cl. ..................................... 210/396; 210/402
[58] Field of Search ............... 210/332, 393, 396, 397, 210/402–404, 407, 408; 15/256.5; 55/295

[56] References Cited
U.S. PATENT DOCUMENTS

| | | | |
|---|---|---|---|
| 1,649,581 | 11/1927 | Genter et al. | 210/396 X |
| 2,604,995 | 7/1952 | Maslin | 210/396 |
| 3,643,806 | 2/1972 | O'Cheskey | 210/396 X |
| 3,869,389 | 3/1975 | Rokitansky | 210/396 X |
| 3,876,548 | 4/1975 | Welles, Jr. | 210/391 |

Primary Examiner—William A. Cuchlinski, Jr.
Attorney, Agent, or Firm—Kinzer, Plyer, Dorn & McEachran

[57] ABSTRACT

A doctor blade assembly for use with a rotating cylinder includes a doctor blade extending axially adjacent the cylinder outer surface and a blade cleaner extending parallel to and adjacent the doctor blade. The blade cleaner is pivotally supported on the doctor blade assembly and there are cooperating means on the cylinder and blade cleaner support for causing intermittent movement of the blade cleaner in a path along the doctor blade upper surface.

14 Claims, 2 Drawing Figures

DOCTOR BLADE CLEANING ASSEMBLY

SUMMARY OF THE INVENTION

The present invention relates to screening devices of the type generally shown in U.S. Pat. No. 3,876,548 and in particular to a means for cleaning the doctor blade used thereon.

One purpose of the invention is a doctor blade cleaning assembly arranged for intermittent operation and providing for an automatic return of the cleaning member.

Another purpose is a doctor blade cleaning assembly of the type described utilizing torsion springs to return the cleaning member.

Another purpose is a doctor blade assembly for use in the described environment including a second doctor blade functioning as a blade cleaner.

Another purpose is reliable and compact means for automatically cleaning the doctor blade used on a screening medium.

Another purpose is a doctor blade cleaning assembly useful for removing particles that may be stapled or otherwise adhering to or hairpinned on the doctor blade.

Other purposes will appear in the ensuing specification, drawings and claims.

BRIEF DESCRIPTION OF THE DRAWINGS

The invention is illustrated diagrammatically in the following drawings wherein.

DESCRIPTION OF THE PREFERRED EMBODIMENT

Screens of the type shown in U.S. Pat. No. 3,876,548 have found utility in sanitary sewage, meat packing operations, canning, paper and pulp making systems poultry processing and the like. When used to separate and dewater solids in a fowl processing application, it has been found that feathers, as well as parts of the fowl intestines, can become caught on the doctor blade which is used to clean the cylinder as it rotates. This is commonly called stapling or hairpinning in the trade, as the particles tend to catch on the edge of the doctor blade adjacent the rotating cylinder and to have portions of the particles extend along both sides of the doctor blade. As small fibers or other material becomes wrapped around the doctor blade the blade will move slightly away from the cylinder. The gap will increase as other particles move in until the space between the blade and cylinder can be as large as $\frac{1}{4}''$ to $\frac{3}{8}''$. Such a gap will permit chunks of material to break loose and fall into the effluent, thus negating the concept of liquid-solid separation. The present doctor blade cleaning assembly is particularly adapted for removing stapled and hairpinned particles and for otherwise cleaning the outer surface and edge of the doctor blade which is directly adjacent the rotating cylinder.

Figure 1:
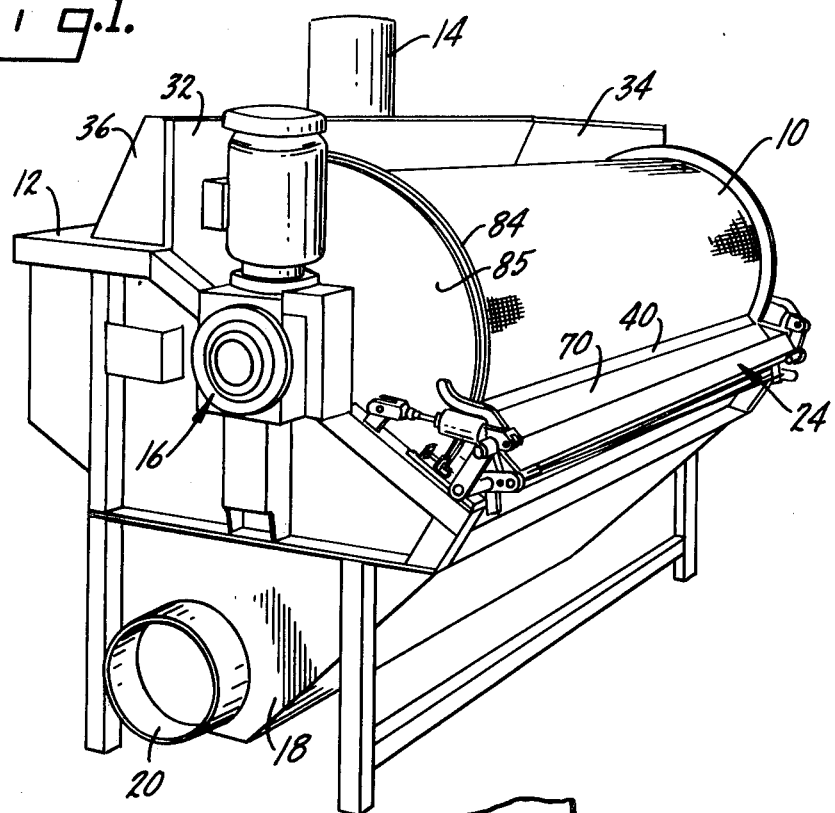
FIG. 1 is a perspective of a screen of the type shown in the above-mentioned patent.

In FIG. 1, a screen 10 receives liquid with entrained solids from a head box 12 which in turn may receive this material through a pipe 14. A drive for the screen is shown generally at 16 and the assembly made up of head box 12, drive 16 and the screen or cylinder 10 may all be mounted on top of a suitable tank or the like 18 having an effluent discharge 20. A doctor blade assembly 24 is on the side of the cylinder opposite from head box 12.

There may be solids containment arms 32 and 34 positioned on opposite sides of the screen and suitably attached to head box 12, as shown at 36. Thus, there is a channel or path defined by arms 32 and 34 to guide the solid-liquid mixture as it is applied to the cylinder. The solids will be carried by the cylinder to doctor assembly 24 and the separated liquid will pass through the cylinder.

Doctor blade assembly 24 includes an axially extending blade 40 having an outer surface 42 and an edge 44 which will bear against rotating screen 10 to remove solids and clean the screen. Blade 40 is mounted in a blade holder 46 which is welded or otherwise attached to shafts 48 attached to bell cranks 50. It should be understood that the described shafts and bell cranks, and further support members to be described, will be positioned on opposite ends of the doctor blade 40 as it is necessary to mount the blade at opposite ends of the screen so as to provide equal pressure from the blade upon the screen throughout its length. Each bell crank 50 is pivotally mounted to a fixed extension 52 of a cylinder 54. The opposite end of each cylinder 54 mounts a threaded rod 56 extending outwardly through a collar 58 of the cylinder. Each threaded rod 56 is mounted in a yoke 60 pivotally mounted on bracket 62 extending outwardly from a portion of the screen support frame.

A handle 64 is also pivotally mounted on extension 52 at the same pivotal mounting as bell crank 50. A coil spring or spring means are positioned within each cylinder 54 with the result that pivotal movement of handle 64, at one end of the doctor blade support, is effective to cause the doctor blade to move toward and away from screen 10 to either apply or release the doctor blade from the screen doctoring position. Although I have described spring means for holding the doctor blade against the cylinder, gravity, hydraulic, pneumatic or electrical means may also be used.

In order to remove stapled or hairpinned particles from edge 44 and from along surface 42 of doctor blade 40, a blade cleaner or automatic blade 70 mounted in a blade holder 72 is positioned on top of doctor blade 40. Blade holder 72 is welded or otherwise attached to shafts 74 which in turn are journaled in pivot arms 76. Each pivot arm 76 is pivotally mounted on a shaft 48 and has arm section 78 and 80 which extend from the pivotal mounting on shaft 48 to the pivotal mounting of shaft 74 and toward the screen. In addition, there may be a stop 82, which for example may be formed of a shock absorbing material, extending outwardly from the pivotal mounting on shaft 48.

Portion 80 of each pivot arm 76 extends between flange 84 of screen 10 and splash guard 85. Mounted on flange 84 is an actuating mechanism or the like 86 which may take the form of a small washer and is positioned to contact arm 80 as the screen rotates. There may be such an actuating mechanism on both screen flanges, or on only one, as there are pivotal arms positioned on opposite ends of the doctor blade cleaner. There may be only one such actuating mechanism on each flange or there may be multiple such devices, depending upon the frequency with which the doctor blade cleaner is to be operated.

Figure 2:
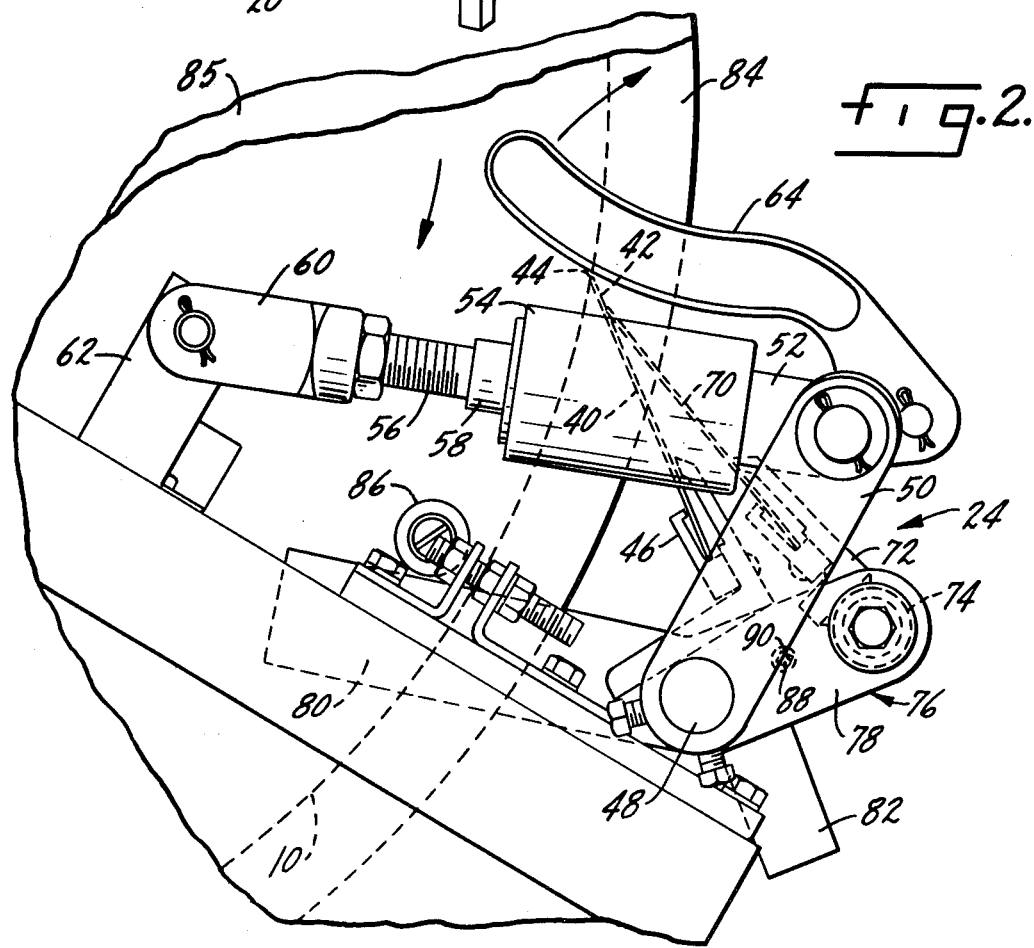
FIG. 2 is an enlarged end view of the doctor blade assembly with the screen housing removed.

As screen 10 rotates, actuating mechanisms 86 will contact arm portions 80 at least once during each rotation of the screen. As such contact is made it will cause arm 76 to pivot in a counterclockwise direction. As arm 76 so pivots, blade cleaner or doctor blade 70 will move in a path such that its upper edge scrapes along upper surface 42 of blade 40, past edge 44 of blade 40, and then upwardly along the rotating screen a distance approximately equal to that which it has traveled along blade 40. After the actuating mechanism has passed arm portion 80 of arm 76, blade 70 may return by gravity, since it has substantial weight, to the position shown in FIG. 2. However, to insure that the blade has a rapid return, and therefore does not in any way hinder the cleaning process of the doctor blade itself, a pair of torsion rods, one of which is shown at 88, are journaled at their opposite ends in a suitable opening 90 in pivot arm 78. It should be noted that the torsion rods cross and that the described pivotal movement of arm 76 will cause both rods to twist with the end result that upon release of the rotary force applied by movement of actuating mechanism 86, torsion rods 88 and 90 will immediately return the doctor blade cleaner to the position shown. Stop 82 limits return movement of the cleaning assembly.

Of particular advantage in the invention is the reliable compact and quick means for causing cleaning movement. The doctor blade cleaner may be operated by screen rotation and can be operated intermittently at any described frequency, depending upon the number of actuating mechanisms of other types of projections which may be attached to the screen to effect operation of the doctor blade cleaner. The doctor blade cleaner is supported at opposite ends, much in the same manner as the doctor blade itself, and the blade cleaner will scrape across the upper surface of the blade and across its upper edge where particles are normally caught. Movement of the doctor blade cleaner also includes a path of travel along the surface of the screen itself to insure that particles caught are removed. It is important that return of the doctor blade cleaner be quick so that removed particles do not again become caught on the end of the doctor blade.

Whereas the preferred form of the invention has been shown and described herein, it should be realized that there may be many modifications, substitutions and alterations thereto.

The embodiments of the invention in which an exclusive property or privilege is claimed are defined as follows:

1. In a doctor blade assembly for use with a rotating cylinder, a doctor blade extending axially adjacent the cylinder outer surface, a blade cleaner extending parallel to and adjacent said doctor blade, means for supporting said blade cleaner for movement in a path across the doctor blade outer surface adjacent the cylinder to remove material from said doctor blade outer surface, and cooperating means on said support means and the rotating cylinder for causing intermittent movement of said blade cleaner along said path.

2. The structure of claim 1 further characterized in that said blade cleaner includes a second doctor blade having a surface in contact with said first named doctor blade at a point spaced from the rotating cylinder.

3. The structure of claim 2 further characterized in that said support means provides for movement of said second doctor blade along said first doctor blade outer surface and along the outer periphery of the rotating cylinder.

4. The structure of claim 3 further characterized in that said second doctor blade moves generally equal distances along said outer surface and along the rotating cylinder.

5. The structure of claim 1 further characterized in that said support means includes a pair of pivotal arms mounted at opposite ends of said doctor blade.

6. The structure of claim 5 further characterized by and including shaft means for pivotally mounting said doctor blade, said pivotal arms being mounted on said shaft means.

7. The structure of claim 6 further characterized in that said blade cleaner is pivotally mounted to said arms.

8. The structure of claim 5 further characterized in that said cooperating means include said pivotal arms and at least one projection on the rotating cylinder.

9. The structure of claim 1 further characterized by and including spring means for returning said blade cleaner along said path after cleaning movement along said doctor blade outer surface.

10. The structure of claim 9 further characterized by and including pivotal arms mounted at opposite ends of said doctor blade for supporting said blade cleaner, said spring means being mounted between said arms.

11. The structure of claim 10 further characterized in that said spring means include a pair of torsion rods extending between said arms.

12. In a doctor blade assembly for use in cleaning a moving device, a doctor blade extending adjacent said device, a blade cleaner extending parallel to and adjacent said doctor blade, and means for supporting said blade cleaner for movement in a path across the doctor blade outer surface to remove material therefrom and across a portion of the moving device directly adjacent said doctor blade.

13. The structure of claim 12 further characterized by and including cooperating means on said support means and moving device for causing intermittent movement of said doctor blade cleaner along said path.

14. The structure of claim 12 further characterized in that said blade cleaner includes a second doctor blade having a surface in contact with said first-named doctor blade at a point spaced from said moving device.

* * * * *